US007346449B2

(12) United States Patent
Sato

(10) Patent No.: US 7,346,449 B2
(45) Date of Patent: Mar. 18, 2008

(54) DRIVING EVALUATION APPARATUS, DRIVING EVALUATION PROGRAM, AND DRIVING EVALUATION METHOD

(75) Inventor: Makoto Sato, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 291 days.

(21) Appl. No.: 11/154,674

(22) Filed: Jun. 17, 2005

(65) Prior Publication Data

US 2005/0288850 A1 Dec. 29, 2005

(30) Foreign Application Priority Data

Jun. 24, 2004 (JP) ............................ 2004-186389

(51) Int. Cl.
*B60L 3/00* (2006.01)

(52) U.S. Cl. ...................................... 701/123; 180/65.4

(58) Field of Classification Search ................ 701/122, 701/123, 99; 180/65.4, 65.1, 65.3, 65.2, 180/65.8, 243; 318/55, 61, 64, 66, 90, 153, 318/565; 702/57, 60; 60/772, 773
See application file for complete search history.

(56) References Cited

U.S. PATENT DOCUMENTS 5,390,117 A * 2/1995 Graf et al. .................... 701/57
5,627,752 A * 5/1997 Buck et al. ................... 701/35
5,688,207 A * 11/1997 Uchida et al. .............. 477/155
5,832,400 A * 11/1998 Takahashi et al. ............ 701/53
6,278,915 B1 * 8/2001 Deguchi et al. .............. 701/22
6,381,522 B1 * 4/2002 Watanabe et al. ............. 701/22
6,436,005 B1 * 8/2002 Bellinger .................... 477/111
6,903,680 B2 * 6/2005 Samukawa et al. .......... 342/173

FOREIGN PATENT DOCUMENTS

JP 3314870 8/2002
JP 2002-362185 12/2002

* cited by examiner

*Primary Examiner*—Dalena Tran
(74) *Attorney, Agent, or Firm*—Finnegan, Henderson, Farabow, Garrett & Dunner, L.L.P.

(57) ABSTRACT

There are provided a driving evaluation method for evaluating a fuel consumption rate of driving a vehicle in certain driving interval on the basis of driving data acquired at time of driving in the driving interval, including: calculating an energy consumption efficiency in the driving interval; calculating a driving environment variable indicative of an environment factor which exerts an influence on energy consumption by driving in the driving interval; selecting a probability density function or a cumulative distribution function corresponding to the calculated driving environment variable from a plurality of probability density functions or cumulative distribution functions having the energy consumption efficiency as a probability variable; and calculating an evaluation value for evaluating a fuel consumption rate of driving in the driving interval by using the selected probability density function or the selected cumulative distribution function and the calculated energy consumption efficiency.

8 Claims, 6 Drawing Sheets

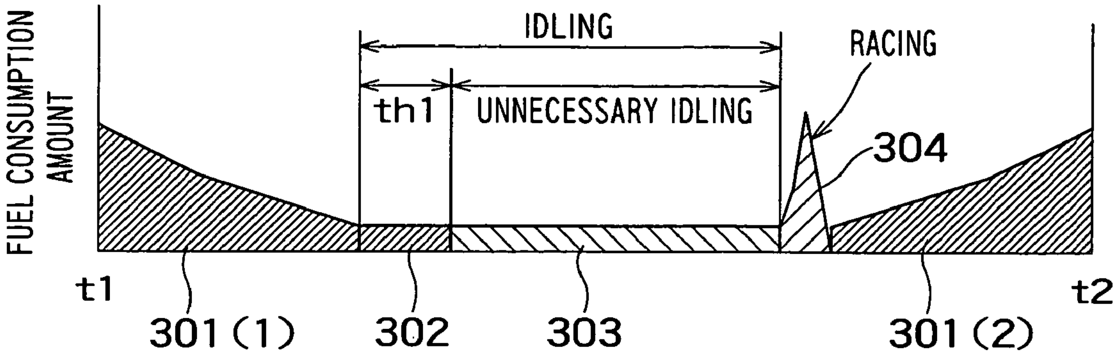
FIG. 3
<INTERVAL FUEL INFORMATION>
INTERVAL FUEL CONSUMPTION RATE (M) : 6.0
IDLING FUEL CONSUMPTION AMOUNT (Fa) : 0.1
RACING FUEL CONSUMPTION AMOUNT (Fk) : 0.05
TOTAL FUEL CONSUMPTION AMOUNT (F) : 0.6
FIG. 4
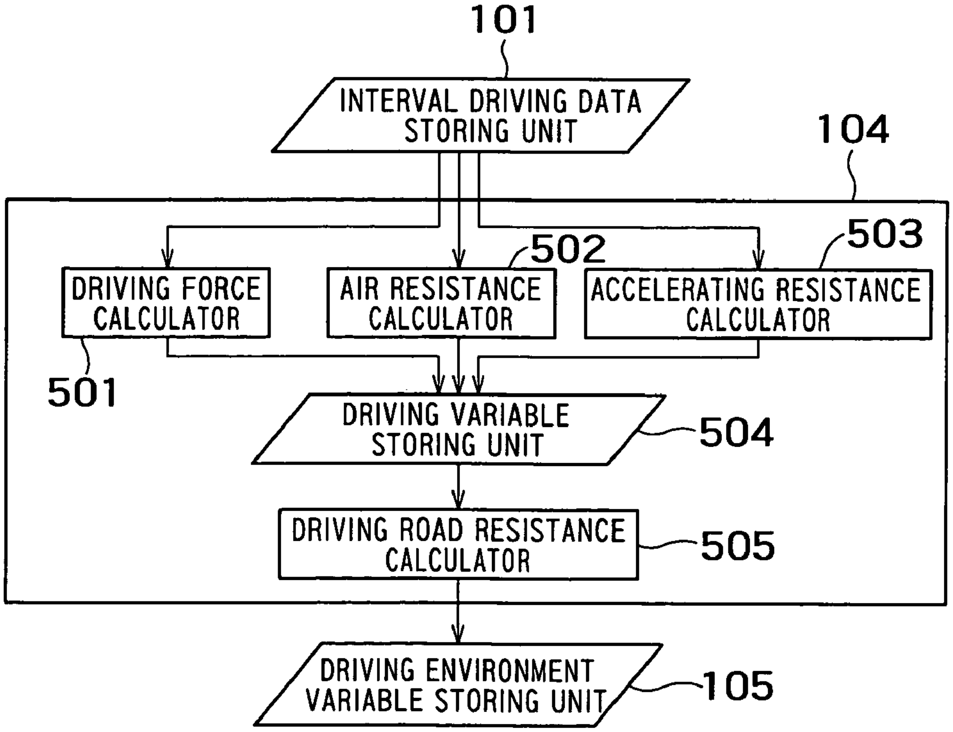
FIG. 5

X1:Average (R') =2.2
X2:m*(v2²−v1²)/2+m*g*(h2−h1)=2.4

FUEL LOSS BY DRIVING IS 0.028 [L]
FUEL LOSS BY IDLING IS 0.1 [L]
FUEL LOSS BY RACING IS 0.05 [L]
TOTAL FUEL LOSS IS 0.178 [L]

DRIVING EVALUATION APPARATUS, DRIVING EVALUATION PROGRAM, AND DRIVING EVALUATION METHOD

CROSS-REFERENCE TO RELATED APPLICATIONS

This application claims the benefit of priority under 35USC § 119 to Japanese Patent Application No. 2004-186389 filed on Jun. 24, 2004, the entire contents of which are incorporated herein by reference.

BACKGROUND OF THE INVENTION

1. Field of the Invention

The present invention relates to a driving evaluation apparatus, a driving evaluation program and a driving evaluation method for evaluating a result of driving of a vehicle (fuel consumption, vehicle speed etc.) in certain driving interval on the basis of driving data of the driving interval. More particularly, the invention relates to a driving evaluation apparatus, a driving evaluation program and a driving evaluation method capable of properly evaluating a driving result while considering situations of various driving roads that cannot be improved by driving skills.

2. Related Art

Because of increasing environment awareness and for the purpose of reducing fuel cost in transportation business, an information system for assisting a driver to learn a driving skill to efficiently drive is in demand. In such a system, a driving evaluation method of evaluating driving from the viewpoint of fuel consumption rate (specific fuel consumption) on the basis of driving data is necessary.

For example, it is also possible to determine an evaluation value, by calculating fuel consumption rate of one day by dividing travel distance in driving data of one day by total fuel consumption amount and checking the fuel consumption rate with a fuel consumption statistic distribution or the like. In such a method, however, there is a problem such that the driver forgets a problem in his/her driving, so that effective assistance cannot be given. It is therefore important to evaluate a driving result in a time interval from a past relative short time to the present time point by using only interval driving data as driving data in the interval and immediately provide the evaluation result to the driver.

The situations (driving environments) of a driving road such as continuation of steep slopes and curves, traffic jam, and the like which exert an influence on the fuel consumption rate but cannot be controlled by driving skills vary according to intervals. Consequently, in evaluation of the driving result in the relatively short time interval, a case may occur such that although driving is efficient, due to relatively bad driving environments, the value of fuel consumption rate is low. On the contrary, a case may occur such that although driving is inefficient, the driving environments are relatively good, so that the value of fuel consumption rate is high. To properly evaluate the result of driving in a relatively short time interval, it is important to calculate a variable related to the driving environments from interval driving data and make an evaluation in which the driving environments are properly reflected.

Japanese Patent No. 3,314,870 discloses a driving evaluation method capable of making an evaluation of interval driving data in which driving environments are reflected. According to the method, a value obtained by correcting a drive fuel consumption rate by an addition value in which driving environments are reflected is used as an evaluation value of the driving result. However, it is difficult to generate a proper point table for calculating the addition value. In the method, how the driving environments from the interval driving data is estimated is not clarified. Therefore, by this method, actually, it is difficult to make an evaluation of the interval driving data in which the driving environments are reflected.

As another driving evaluation method capable of making an evaluation of interval driving data in which the driving environments are reflected, there is a driving evaluation method in a vehicle-driving-state-evaluating-system disclosed in Japanese Patent Laid-Open No. 2002-362185. In the method, various "driving manners that deteriorate fuel consumption rate" defined on the basis of a domain knowledge of bad driving manners which deteriorate fuel consumption rate are detected from the interval driving data. The difference between actual fuel consumption amount of detected driving and a theoretical fuel consumption amount in the case of ideal driving without driving which deteriorates fuel consumption is calculated, and efficiency of driving is evaluated by the difference. Examples of "driving manners which deteriorate fuel consumption rate" are (1) excessive driving force, (2) over speed, (3) erroneous shifting, (4) racing, and (5) idling. For example, in determination of whether (1) excessive driving force is used or not, by calculating hill climbing resistance at the time of calculating driving force, a driving evaluation in which the driving environment of a hill in a driving road is reflected can be made. The method of detecting "driving manners which deteriorate fuel consumption rate" and evaluating the driving result has an advantage such that inefficient driving can be notified to the driver immediately after detection.

The method, however, has a problem such that since the driving result is evaluated on the basis of detection of pre-defined "driving manners which deteriorate fuel consumption rate", even if inefficient driving which cannot be detected exists, it is ignored. Moreover, since it is difficult to define a driving manner that deteriorates fuel consumption rate in all of driving environments, even if driving is efficient, it may be evaluated inefficient depending on the driving environments.

SUMMARY OF THE INVENTION

According to an aspect of the present invention, there is provided a driving evaluation apparatus for evaluating a result of driving a vehicle in certain driving interval on the basis of driving data acquired at time of driving in the driving interval, comprising: an energy consumption efficiency calculator calculating an energy consumption efficiency in the driving interval, by using the driving data; a driving environment variable calculator calculating a driving environment variable indicative of an environment factor which exerts an influence on energy consumption by driving in the driving interval, on the basis of the driving data; a function storing unit storing a plurality of probability density functions or cumulative distribution functions having the energy consumption efficiency as a probability variable; a function selector selecting the probability density function or the cumulative distribution function corresponding to the calculated driving environment variable; and an evaluation value calculator calculating an evaluation value for evaluating a result of driving in the driving interval by using the selected probability density function or the selected cumulative distribution function and the calculated energy consumption efficiency.

According to an aspect of the present invention, there is provided a driving evaluation program for evaluating a result of driving a vehicle in certain driving interval on the basis of driving data acquired at time of driving in the driving interval and for making a computer execute, comprising: calculating an energy consumption efficiency in the driving interval, by using the driving data; calculating a driving environment variable indicative of an environment factor which exerts an influence on energy consumption by driving in the driving interval, on the basis of the driving data; selecting a probability density function or a cumulative distribution function corresponding to the calculated driving environment variable from a plurality of probability density functions or cumulative distribution functions having the energy consumption efficiency as a probability variable; and calculating an evaluation value for evaluating a result of driving in the driving interval by using the selected probability density function or the selected cumulative distribution function and the calculated energy consumption efficiency.

According to an aspect of the present invention, there is provided a driving evaluation method for evaluating a result of driving a vehicle in certain driving interval on the basis of driving data acquired at time of driving in the driving interval, comprising: calculating an energy consumption efficiency in the driving interval, by using the driving data; calculating a driving environment variable indicative of an environment factor which exerts an influence on energy consumption by driving in the driving interval, on the basis of the driving data; selecting a probability density function or a cumulative distribution function corresponding to the calculated driving environment variable from a plurality of probability density functions or cumulative distribution functions having the energy consumption efficiency as a probability variable; and calculating an evaluation value for evaluating a result of driving in the driving interval by using the selected probability density function or the selected cumulative distribution function and the calculated energy consumption efficiency.

BRIEF DESCRIPTION OF THE DRAWINGS

FIG. 3 is a diagram showing an example data of interval fuel consumption amount;

FIG. 4 is a diagram showing an example of interval fuel information;

FIG. 5 is a configuration diagram showing part of driving environment variable calculator in FIG. 1;

DETAILED DESCRIPTION OF THE INVENTION

An embodiment of the invention will be described hereinbelow with reference to the drawings.

Figure 1:
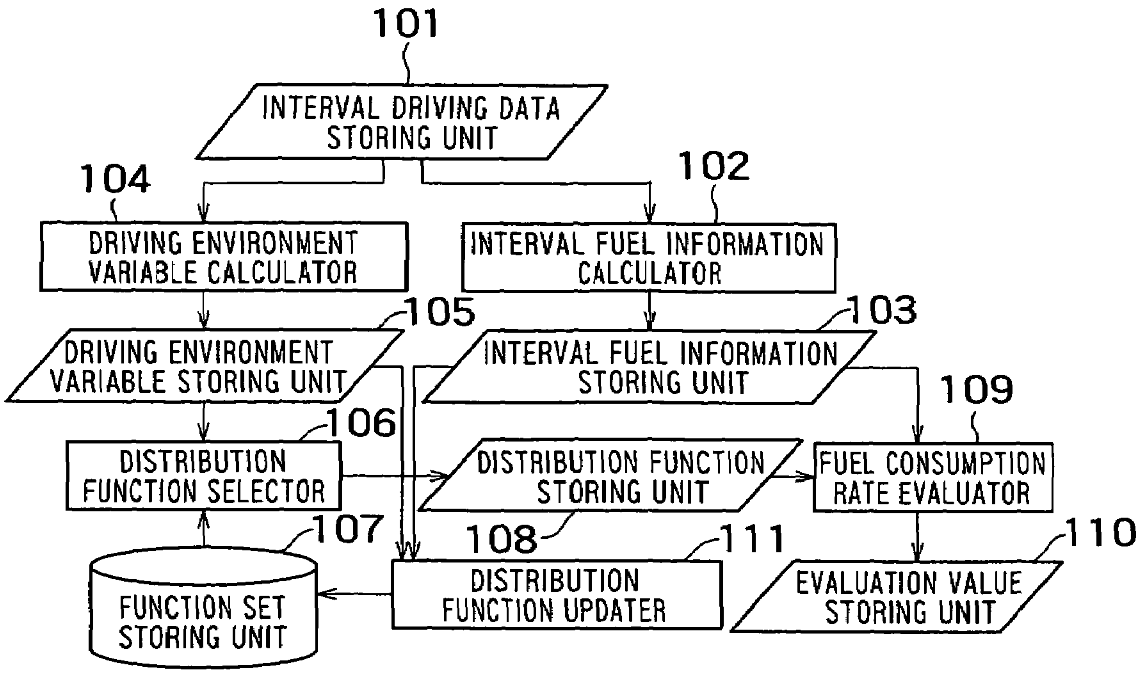
FIG. 1 is a configuration diagram of a driving evaluation apparatus according to an embodiment of the invention.

FIG. 1 is a configuration diagram showing an embodiment of a driving evaluation apparatus of the invention. As shown in FIG. 1, the driving evaluation apparatus comprises interval driving data storing unit 101, interval fuel information calculator 102, interval fuel information storing unit 103, driving environment variable calculator 104, driving environment variable storing unit 105, distribution function selector 106, function set storing unit 107, distribution function storing unit 108, fuel consumption rate evaluator 109, evaluation value storing unit 110, and distribution function updater 111.

In the interval driving data storing unit 101, driving data of a vehicle, which is a collection of sampling data sampled at predetermined period (for example, 200 msec) in certain driving interval, is stored. The driving interval has certain time range (for example, 1 minute or 10 seconds etc.) from start point time to end point time. The vehicle includes, for example, truck, internal combustion engine vehicle, electric vehicle, electric bicycle, and bike. In the following description, an internal combustion engine vehicle is assumed. The kinds of driving data of a vehicle vary according to sensors mounted on the vehicle. In present example, information of at least fuel consumption amount (energy consumption amount), vehicle speed, engine rotational speed, and clutch state is necessary. Preferably, information such as vehicle position, vehicle altitude, accelerator operation amount, vehicle acceleration, vehicle weight, and the like is included in time sequence. In the case where the vehicle is an electric vehicle or electric bicycle, the energy consumption amount corresponds to, for example, electricity consumption amount.

The interval fuel information calculator 102 calculates information with respect to fuel consumption in the driving interval by using the interval driving data stored in the interval driving data storing unit 101 and stores the calculated information as interval fuel information into the interval fuel information storing unit 103. The interval fuel information, for example, may include fuel consumption rate (energy consumption rate). The fuel consumption rate is, for example, obtained as follows.

Travel distance D in the driving interval is calculated by adding the vehicle speed data. By calculating the sum of the fuel consumption amount, total fuel consumption amount F is obtained. By D/F, the interval fuel consumption rate is computed. The interval fuel consumption rate, for example, corresponds energy consumption efficiency.

Alternately, the interval fuel consumption rate may be computed as follows.

Fuel consumption amount obtained by subtracting a fuel amount consumed by racing or excessive idling regarded as inefficient driving irrespective of driving environments from the total fuel consumption amount F is computed. The travel distance D is divided by the fuel consumption amount, thereby obtaining interval fuel consumption rate M.

In the following description, the interval fuel consumption rate M is assumed. As will be described later, by using the interval fuel consumption rate M as one of interval fuel information, the skill of driving can be purely evaluated. The interval fuel information calculator 102 will be described in more detail hereinbelow.

Figure 2:
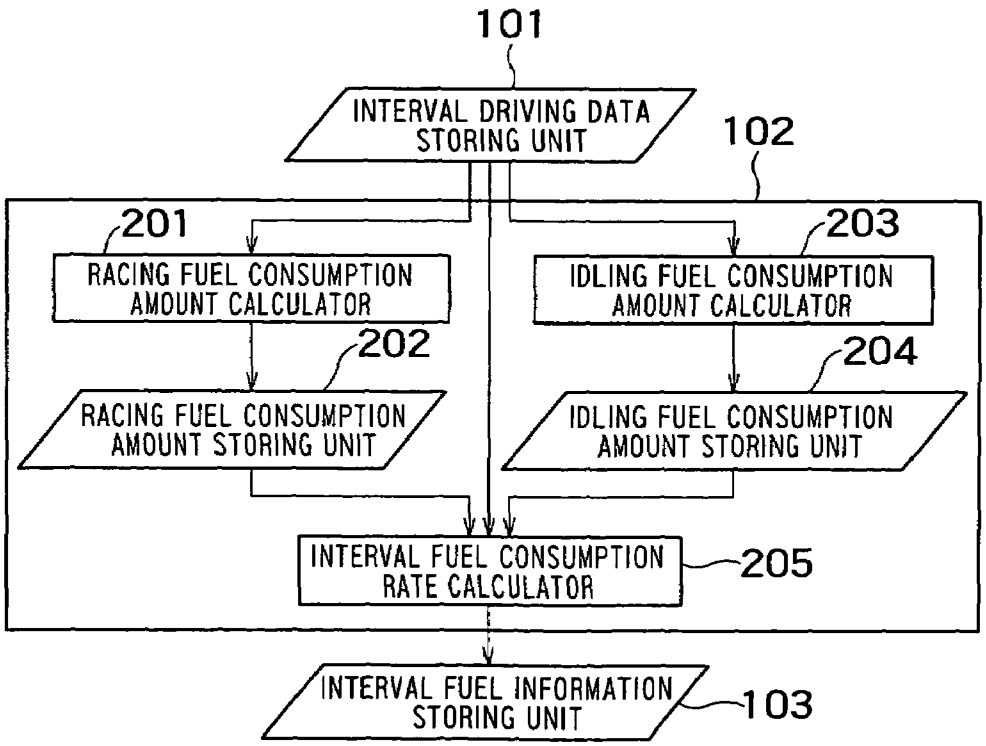
FIG. 2 is a configuration diagram of interval fuel information calculator in FIG. 1.

FIG. 2 is a configuration diagram of the interval fuel information calculator 102 in FIG. 1. As shown in FIG. 2, the interval fuel information calculator 102 has racing fuel consumption amount calculator 201, racing fuel consumption amount storing unit 202, idling fuel consumption rate calculator 203, idling fuel consumption amount storing unit 204, and interval fuel consumption rate calculator 205.

The racing fuel consumption amount calculator 201 detects a domain in which racing is performed by using the interval driving data and calculates racing fuel consumption amount Fk as fuel amount consumed in the domain. The calculated fuel consumption amount Fk is stored in the racing fuel consumption amount storing unit 202. The racing can be detected by extracting a time domain in which the speed is close to zero, the clutch is disengaged, and the engine rotational speed is high.

The idling fuel consumption amount calculator 203 detects a time domain in which idling is performed by using the interval driving data. In the case where idling is performed for time threshold th1 or longer in the domain, it is regarded as unnecessary idling. When unnecessary idling is detected, idling fuel consumption amount Fa as fuel amount consumed in the domain is calculated and stored in the idling fuel consumption amount storing unit 204. The idling can be detected by extracting a time domain in which speed is close to zero and engine rotational speed is close to predetermined idle speed.

The interval fuel consumption rate calculator 205 calculates the sum of speeds, thereby obtaining the travel distance D in the driving interval and computes the above total fuel consumption amount F. The interval fuel consumption rate calculator 205 calculates interval fuel consumption rate M as follows.

$$M=D/(F-Fa-Fk)$$

The interval fuel consumption rate calculator 205 stores M, Fa, Fk, and F as the interval fuel information into the interval fuel information storing unit 103. In the embodiment, although the value obtained by dividing fuel consumption amount by distance is used as fuel consumption rate, a value obtained by dividing distance by fuel consumption amount may be used.

FIG. 3 is a diagram for explaining fuel consumption amount in the driving interval from time t1 to time t2. Domains 301(1) and 301(2) in the diagram show fuel amounts consumed by normal driving. A domain 302 indicates a fuel amount consumed by allowable idling within time th1 from the idling start. A domain 303 indicates a fuel amount (Fa) consumed by unnecessary idling over the time th1 from the start of idling. A domain 304 indicates a fuel amount (Fk) consumed by racing. In the example, by dividing the fuel consumption amount corresponding to sum area of the domains 301(1), 301(2), and 302 by the driving distance D in the driving interval, the interval fuel consumption rate M is calculated.

FIG. 4 shows an example of the interval fuel information (M, Fa, Fk, and F) and shows the interval fuel consumption rate M, idling fuel consumption amount Fa, racing fuel consumption amount Fk, and total fuel consumption amount F. As described above, the interval fuel information (M, Fa, Fk, and F) is stored in the interval fuel information storing unit 103.

Referring again to FIG. 1, the driving environment variable calculator 104 calculates the value of a driving environment variable indicative of the situations of a drive path which exerts an influence on fuel consumption but cannot be changed by a driving skill, using the interval driving data stored in the interval driving data storing unit 101. The value of the driving environment variable calculated is stored in the driving environment variable storing unit 105. There may be plural kinds of driving environment variables.

FIG. 5 is a configuration diagram of a part for calculating a driving road resistance as one of driving environment variables in the driving environment variable calculator 104. The driving road resistance is, as will be described in detail hereinbelow, resistance to a vehicle, which is almost continue to be brought to the vehicle during a driving, irrespective of driving skill. As shown in FIG. 5, the driving environment variable calculator 104 has driving force calculator 501, air resistance calculator 502, accelerating resistance calculator 503, driving variable storing unit 504, and driving road resistance calculator 505.

The driving force calculator 501 calculates driving force F(t) in the vehicle travel direction at each of time points (sampling points) "t" in the driving interval, and stores the calculated driving force F(t) into the driving variable storing unit 504. The driving force can be obtained by preparing, for example, a torque map for calculating a torque τe(t) supposed to be output from an engine on the basis of the fuel consumption amount and the engine rotational speed at each time point, and calculated by the following equation.

$$F(t)=\alpha*G(t)*\tau e(t)/r$$

where G(t) denotes speed reducing ratio of a gear at time (t), α denotes transfer efficiency of the gear, and r indicates radius of a tire. They are given in advance in accordance with the car model.

The air resistance calculator 502 calculates air resistance Rl(t) in the vehicle travel direction at each time point "t" in the driving interval by using the interval driving data and stores the calculated air resistance Rl(t) into the driving variable storing unit 504. The air resistance can be calculated by, for example, the following equation using speed v(t) at each time point.

$$Rl(t)=\beta*v(t)^2$$

where β denotes coefficient of air resistance and is preliminarily given in accordance with the car model.

The accelerating resistance calculator 503 calculates accelerating resistance (resistance generated at the time of acceleration/deceleration) Ra(t) in the vehicle travel direction at each time point "t" in the driving interval, and stores the calculated accelerating resistance Ra(t) into the driving variable storing unit 504. The accelerating resistance can be obtained by, for example, calculating vehicle weight m(t) and acceleration a(t) in the vehicle travel direction at each time point and by using the following.

$$Ra(t)=m(t)*a(t)$$

The driving road resistance calculator 505 calculates driving road resistance by the following using driving force F(t), air resistance Rl(t), and accelerating resistance Ra(t) stored in the driving variable storing unit 504.

$$\text{Average}(F(t)-Rl(t)-Ra(t))$$

The calculated driving road resistance is stored as one of the driving environment variables into the driving environment variable storing unit 105.

Average ( ) denotes the function for calculating an average value of arguments. Resistance obtained by subtracting the air resistance and the accelerating resistance from the driving force is regarded as resistance such as hill climbing resistance (resistance by inclination of a hill) or rolling resistance (resistance generated when a tire rolls on the road surface), which cannot be controlled by a driving skill. Therefore, the driving road resistance can be considered as a feature quantity in which the situations of a driving are properly reflected from the viewpoint of resistance.

Figure 6:
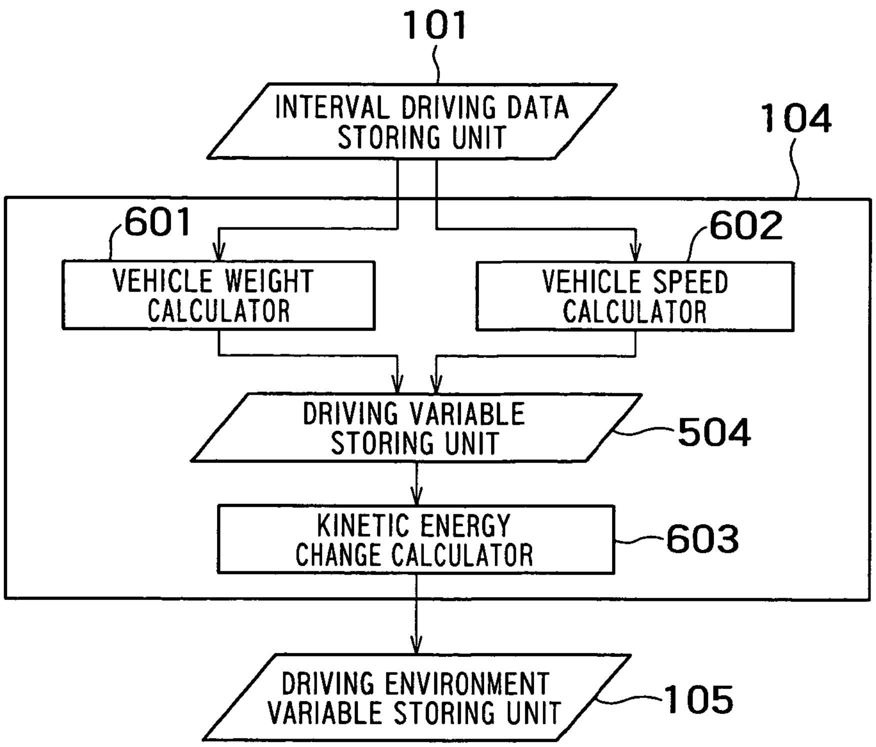
FIG. 6 is a configuration diagram showing part of the driving environment variable calculator in FIG. 1.

FIG. 6 is a configuration diagram of a part for calculating a kinetic energy change as one of the driving environment variables in the driving environment variable calculator 104. As shown in FIG. 6, the driving environment variable calculator 104 has vehicle weight calculator 601, vehicle speed calculator 602, driving variable storing unit 504, and kinetic energy change calculator 603.

The vehicle weight calculator 601 calculates vehicle weights m(t1) and m(t2) at start point time to and end point time t2 in the driving interval by using, for example, the value m(t) of a vehicle weight sensor in the interval driving data. The calculated vehicle weights m(t1) and m(t2) are stored in the driving variable storing unit 504.

The vehicle speed calculator 602 calculates vehicle speeds v(t1) and v(t2) at the start point time t1 and the end point time t2 in the driving interval by using, for example, the value v(t) of the vehicle speed sensor. The calculated vehicle speeds v(t1) and v(t2) are stored in the driving variable storing unit 504.

The kinetic energy change calculator 603 calculates the kinetic energy change amount by the following equation using the vehicle weights m(t1) and m(t2) and vehicle speeds v(t1) and v(t2) stored in the driving variable storing unit 504.

$$(m(t2)*v(t2)^2-m(t1)*v(t1)^2)/2$$

The calculated kinetic energy change amount is stored as one of the driving environment variables into the driving environment variable storing unit 105.

It is assumed that the driver can change the vehicle speed in the driving interval by his/her intention but cannot select the speeds at the interval start and end points. In this case, the kinetic energy change amount can be regarded as a feature quantity in which the situations of the drive path as necessity of acceleration/deceleration are reflected.

Figure 7:
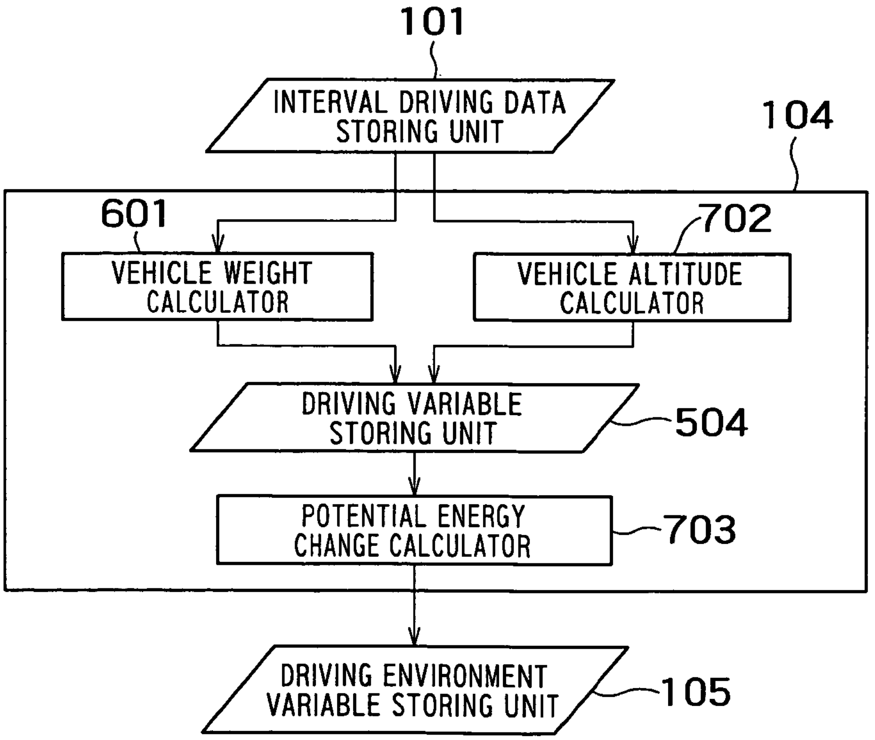
FIG. 7 is a configuration diagram showing part of the driving environment variable calculator in FIG. 1.

FIG. 7 is a configuration diagram of a part for calculating the potential energy change as one of the driving environment variables in the driving environment variable calculator 104. As shown in FIG. 7, the driving environment variable calculator 104 has the vehicle weight calculator 601, vehicle altitude (height) calculator 702, driving variable storing unit 504, and potential energy change calculator 703.

The vehicle weight calculator 601 calculates the vehicle weights m(t1) and m(t2) at the start point time t1 and end point time t2 in the driving interval by using, for example, the value m(t) of a vehicle weight sensor in the interval driving data. The calculated vehicle weights m(t1) and m(t2) are stored in the driving variable storing unit 504.

The vehicle altitude calculator 702 calculates vehicle altitudes h(t1) and h(t2) at the start point time to and the end point time t2 in the driving interval by using, for example, altitude information h(t) of a GPS. The calculated vehicle altitudes h(t1) and h(t2) are stored in the driving variable storing unit 504.

The potential energy change calculator 703 calculates the potential energy change amount by the following equation using the vehicle weights m(t1) and m(t2) and vehicle altitudes h(t1) and h(t2) stored in the driving variable storing unit 504.

$$g*(m(t2)*h(t2)-m(t1)*h(t1))$$

The calculated potential energy change amount is stored as one of the driving environment variables into the driving environment variable storing unit 105.

It is assumed that the driver can change the vehicle altitude in the driving interval by his/her intention but cannot select the altitudes at the interval start and end points. In this case, the potential energy change amount can be regarded as a feature quantity in which the situations of the drive path as necessity of climbing are reflected.

Alternately, to reflect the situations of a driving road such as a traffic jam of a driving road, for example, average vehicle speed, average distance to a forward vehicle, and the like may be used as the driving environment variable. An energy change amount obtained by adding the kinetic energy change amount and the potential energy change amount may be used as the driving environment variable.

Figure 8:
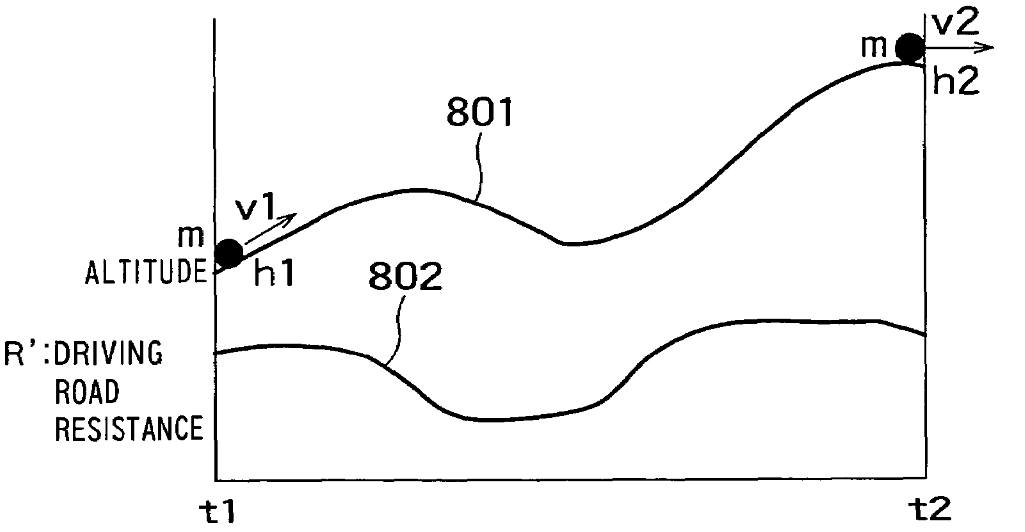
FIG. 8 is a diagram showing an example calculation of a driving environment variable.

FIG. 8 shows an example calculation of the driving environment variable more concretely. In the example, the vehicle speed, vehicle weight, and vehicle altitude at the interval start point are calculated as v1, m, and h1, respectively. The vehicle speed, vehicle weight, and vehicle altitude at the interval end point are calculated as v2, m, and h2, respectively. Time sequence of driving road resistance 802 is also calculated. The values of driving environment variables, specifically, driving road resistance average X1 and energy change amount X2 are calculated as 2.2 and 2.4, respectively.

Referring again to FIG. 1, the distribution function selector 106 selects a distribution function (probability density function) corresponding to the driving environment variables stored in the driving environment variable storing unit 105 from function set stored in the function set storing unit 107. The selected distribution function is stored in the distribution function storing unit 108.

Figure 9:
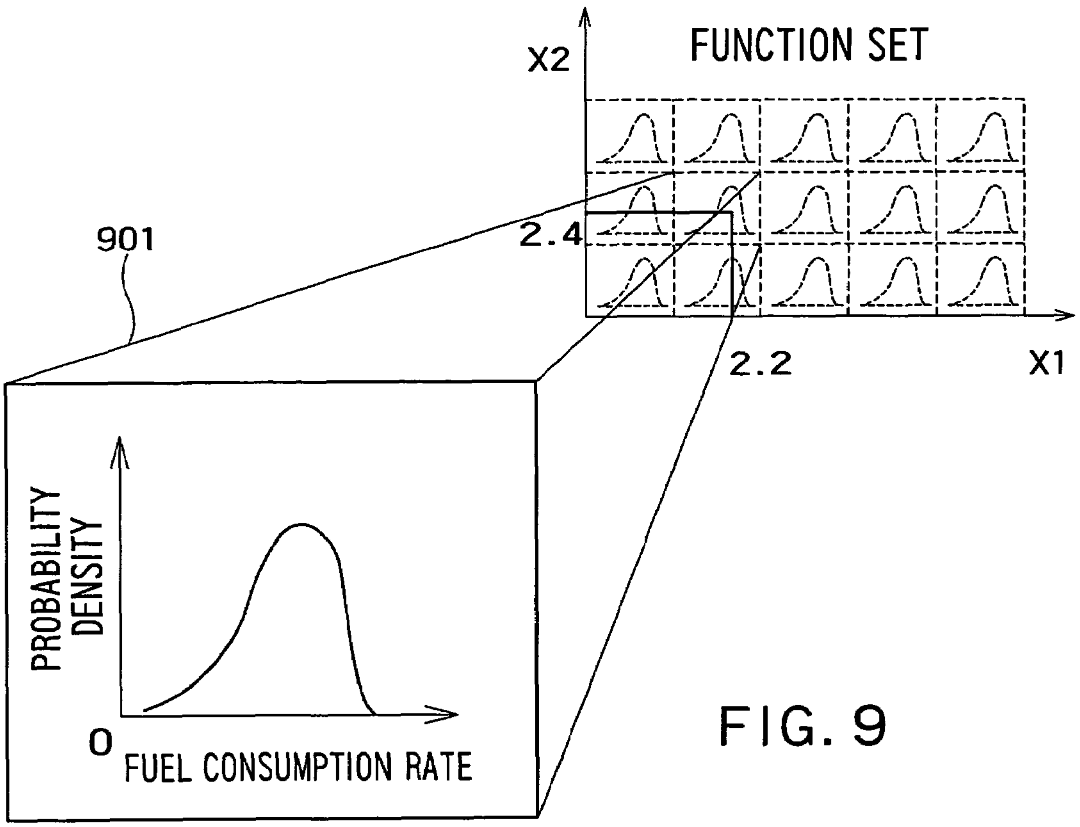
FIG. 9 is a diagram showing an example of a distribution function.

FIG. 9 shows an example of selecting a distribution function 901 from the function set. From the function set which are arranged in a lattice shape, a distribution function 901 corresponding to the driving environment variables (X1, X2)=(2.2, 2.4) is selected.

The distribution functions are obtained from actual driving of various drivers including a skilled driver and an inexperienced driver on various driving roads. The distribution function shows a probability density function for obtaining the probability of fuel consumption rate from the fuel consumption rate.

When the probability density function are integrated in the total range, 1 is obtained. The distribution function corresponding to the driving environment variable indicative of a downhill may be a narrow distribution because the influence on the fuel consumption of the driving skill is small. On the other hand, a distribution function corresponding to the driving environment variable indicative of an uphill may be a wide distribution because the fuel consumption largely fluctuates depending on the driving skill. In place of the probability density function, a cumulative distribution function may be also used. The probability density function and the cumulative distribution function have the relation that an integral of probability density function matches a cumulative distribution function. The cumulative distribution function increases from 0 to 1 as a probability variable increases.

Referring again to FIG. 1, the fuel consumption rate evaluator 109 evaluates the driving result by using the interval fuel information (M, Fa, Fk, and F) stored in the interval fuel information storing unit 103 and distribution function stored in the distribution function storing unit 108 and stores the evaluation result into the evaluation value storing unit 110. The fuel consumption rate evaluator 109 will be described more specifically.

Figure 10:
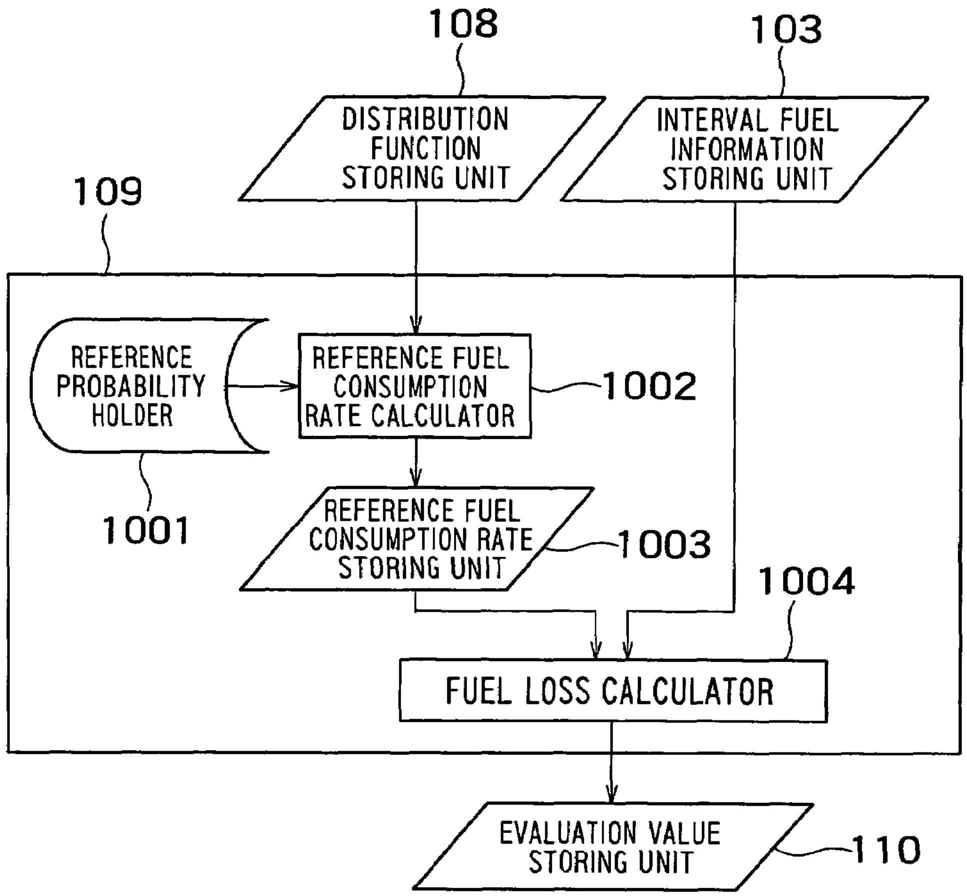
FIG. 10 is a configuration diagram of the fuel consumption rate evaluator of FIG. 1.

FIG. 10 is a configuration diagram of the fuel consumption rate evaluator 109. As shown in FIG. 10, the fuel consumption rate evaluator 109 has reference probability holder 1001, reference fuel consumption rate calculator 1002, reference fuel consumption rate storing unit 1003, and fuel loss calculator 1004.

In the reference probability holder 1001, a reference probability as a value in which a target level of driving is reflected is stored. For example, reference probability of 0.7 is stored.

The reference fuel consumption rate calculator 1002 calculates reference fuel consumption rate so that a value obtained by integrating the distribution function from 0 to the reference fuel consumption rate becomes the reference probability by using the distribution function stored in the distribution function storing unit 108. The calculated reference fuel consumption rate is stored into the reference fuel consumption rate storing unit 1003.

Figure 11:
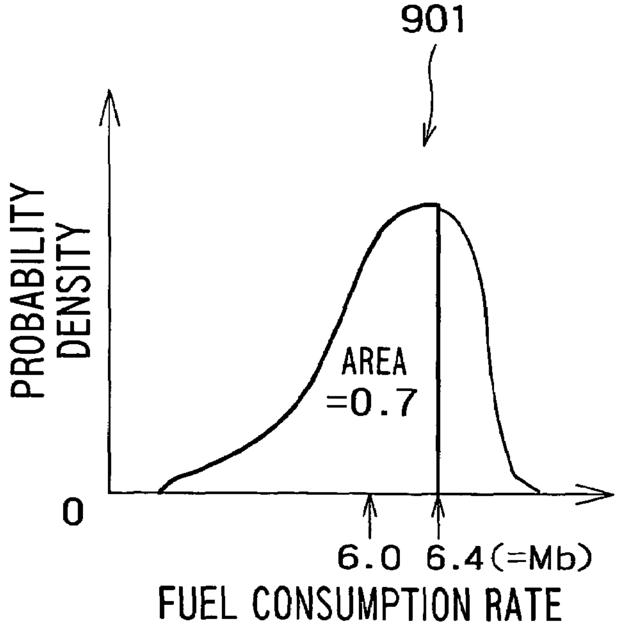
FIG. 11 is a diagram showing an example calculation of reference fuel consumption rate.

FIG. 11 shows an example calculation of the reference fuel consumption rate. In the example, the fuel consumption rate 6.4 corresponding to the reference probability 0.7 is calculated as reference fuel consumption rate Mb. That is, a result (area) of integrating the distribution function 901 from 0 to 6.4 is 0.7. If actual fuel consumption rate M is 6.0, it can be considered that there is a fuel loss of 0.4 with respect to the target fuel consumption level (6.4).

The fuel loss calculator 1004 calculates a fuel loss in the driving interval by using the interval fuel information (M, Fa, Fk, and F) stored in the interval fuel information storing unit 103 and the reference fuel consumption rate stored in the reference fuel consumption rate storing unit 1003. The calculated fuel loss is stored as an interval evaluation value into the evaluation value storing unit 110.

Figures 12, 13:
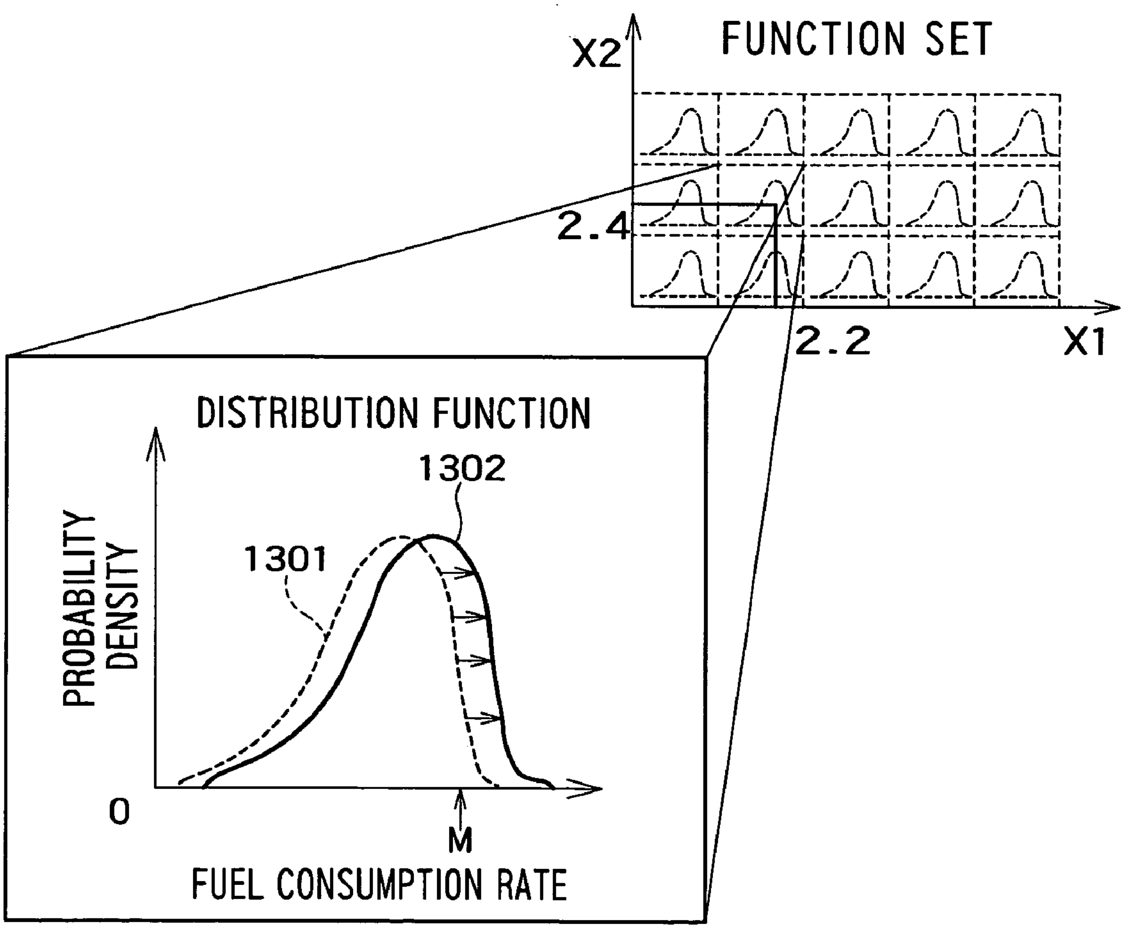
FIG. 12 is a diagram showing an example of an interval fuel consumption evaluation value.
FIG. 13 is a diagram showing an example of updating of a distribution function.

FIG. 12 shows an example of the interval evaluation value calculated from the interval fuel information (M, Fa, Fk, and F) in FIG. 4 and the reference fuel consumption rate Mb in FIG. 11. A fuel loss 0.028 by driving in the driving interval shown in FIG. 12 is calculated by the following equation.

$$(F-Fa-Fk)*(Mb-M)/Mb \approx 0.028 [l]$$

From the fuel loss, the driving skill can be purely evaluated.

FIG. 12 shows, in addition to the fuel loss by driving, a fuel loss Fa (=0.1) by idling, a fuel loss Fk (=0.05) by racing, and a total fuel loss (=0.028+0.1+0.05) obtained by adding all of the losses.

By feeding back the evaluation result in which situations of various driving roads are reflected to the driver, the driver can recognize the result of his/her driving in a real time.

Referring again to FIG. 1, the distribution function updater 111 updates a distribution function in the function set storing unit 107, corresponding to the driving environment variable stored in the driving environment variable storing unit 105 by using the interval fuel information stored in the interval fuel information storing unit 103.

FIG. 13 shows an example of updating of a distribution function. When it is assumed that fuel consumption rate M as a value larger than an average occurs in the distribution function, updating is performed to shift an original distribution function 1301 to the right, thereby obtaining a distribution function 1302. Concretely, updating is performed by using, for example, maximum likelihood estimation, Bayesian estimation, and the like. By such updating, a distribution function in which the driving skill level of the driver and the driving skill level of a driver group sharing the function set are properly reflected can be obtained by learning.

The processes performed by the driving evaluation apparatus can be also realized by causing a computer to execute a program.

The components shown in FIG. 1 may be disposed in the same apparatus or disposed separately in different apparatuses. For example, the components 101 to 105 are disposed in an apparatus in a vehicle to be evaluated, and the components 106 to 111 are disposed in an apparatus mounted in a data center or the like. In this case, the data in the interval fuel information storing unit 103 and the driving environment variable storing unit 105 is transmitted from the apparatus in the vehicle to the apparatus mounted in the data center or the like. The apparatus mounted in the data center or the like evaluates the driving result on the basis of the data received from the apparatus in the vehicle.

As described above, according to the embodiment, a distribution function according to the present driving environments is selected from the function set, and the driving result is evaluated on the basis of the selected distribution function. Therefore, the driving result can be evaluated while properly reflecting the driving environments without depending on domain knowledge.

According to the embodiment, the distribution function is updated by using the driving environment variables and interval fuel information obtained from actual driving of drivers. Consequently, the distribution function matching the level of the driving skill of the driver and the level of the driving skill of the driver group sharing the function set can be obtained by learning, and the driving result can be effectively evaluated.

According to the embodiment, in the driving interval, average of driving road resistance which continues to be exerted to a vehicle irrespective of driving skill during a driving is calculated, and the calculated value is used as the driving environment variable. Therefore, driving can be evaluated while reflecting resistance out of relation to the skill of a driver.

According to the embodiment, change in the kinetic energy in the driving interval is calculated, and the calculated value (kinetic energy change amount) is used as a driving environment variable. Thus, evaluation of driving in which the driving environments of necessity of acceleration are reflected can be made.

Specifically, when the speeds at the start and end points in the driving interval are regarded as regulations which cannot be selected by the driver, in a driving interval where a vehicle has to be accelerated, the driving environments are regarded as bad from the viewpoint of fuel consumption rate. In a driving interval where a vehicle has to be decelerated, the driving environments are regarded as good. In the embodiment, the driving result can be evaluated while properly considering the situations.

According to the embodiment, change in the potential energy in the driving interval is calculated, and the calculated value (potential energy change amount) is used as a driving environment variable. Consequently, efficiency of driving in which the driving environment such as necessity of climbing is reflected can be evaluated.

Specifically, when the altitudes at the start and end points in the driving interval are regarded as regulations which cannot be selected by the driver, in a driving interval where the vehicle has to climb a hill, driving environments are regarded as bad from the viewpoint of fuel consumption rate. In a driving interval where a vehicle drives on a downhill, the driving environments are regarded as good. In the embodiment, the driving result can be evaluated while properly considering the situations.

According to the embodiment, the distance between the target vehicle and a forward vehicle in the driving interval is calculated, and average distance between vehicles is used as the driving environment variable. Consequently, the driving result can be evaluated while properly reflecting the driving environments such as a traffic jam state of a driving road.

Specifically, the average distance between vehicles approximately reflects the traffic jam state of the driving road. The state where traffic jam occurs is regarded as a bad driving environment from the viewpoint of fuel consumption rate. In the embodiment, by using the average distance between vehicles as the driving environment variable, the driving result can be evaluated while properly considering the traffic jam state of the driving road.

According to the embodiment, fuel consumption rate based on a fuel consumption amount excluding an amount of fuel consumed by racing and excessive idling which are regarded inefficient in any driving environments is evaluated. Consequently, the driving skill can be purely evaluated.

According to the embodiment, the difference between the fuel consumption amount corresponding to given reference probability and actual fuel consumption amount is calculated. Therefore, a fuel loss in the current interval can be fed back to the driver.

For example, when the reference probability is set to 0.5, by comparing expected fuel consumption amount in the case of driving with an average skill with actual fuel consumption amount, a fuel loss with respect to the average level in the current interval can be fed back to the driver. By fixing the reference probability, evaluation can be made on the basis of the consistent driving skill level irrespective of the driving environments.

According to the embodiment, a total fuel loss amount is calculated by adding the difference between fuel consumption amount by actual normal driving (which does not include racing and idling) and reference fuel consumption amount without racing and idling (fuel loss caused according to pure driving skill) and the amount of a fuel loss caused by racing and excessive idling which is regarded inefficient in any driving environments. Therefore, the driving result in which factors other than the pure driving skill are taken into account can be fed back to the driver more properly.

What is claimed is:

1. A driving evaluation apparatus for evaluating a result of driving a vehicle in a certain driving interval on the basis of driving data acquired at a time of driving in the driving interval, comprising:

an energy consumption efficiency calculator calculating an energy consumption efficiency in the driving interval, by using the driving data;

a driving environment variable calculator calculating a driving environment variable indicative of an environment factor which exerts an influence on energy consumption by driving in the driving interval, on the basis of the driving data;

a function storing unit storing a plurality of probability density functions or cumulative distribution functions having the energy consumption efficiency as a probability variable;

a function selector selecting a probability density function or a cumulative distribution function corresponding to the calculated driving environment variable; and an evaluation value calculator calculating an evaluation value for evaluating a result of driving in the driving interval by using the selected probability density function or the selected cumulative distribution function and the calculated energy consumption efficiency, wherein the energy consumption efficiency calculator calculates an energy consumption amount in the driving interval, a travel distance in the driving interval, and a racing energy consumption amount as an energy amount consumed by racing in the driving interval and calculates, as the energy consumption efficiency, a no-racing energy consumption rate which is an expected energy consumption rate in the case where no racing is performed, on the basis of a no-racing energy consumption amount as a difference between the energy consumption amount and the racing energy consumption amount and the travel distance.

2. The driving evaluation apparatus according to claim 1, wherein the evaluation value calculator calculates a reference energy consumption rate as an energy consumption rate corresponding to a reference probability indicative of a given target driving skill level, by using the probability density function or the cumulative distribution function selected by the function selector, calculates a reference energy consumption amount as an energy amount consumed in the case where driving is performed at the reference energy consumption rate, and calculates the evaluation value by adding the racing energy consumption amount to a difference between the no-racing energy consumption amount and the reference energy consumption amount.

3. The driving evaluation apparatus according to claim 1, the driving environment variable calculator comprising:

a vehicle altitude calculator calculating an interval start point altitude and an interval end point altitude as altitudes of the vehicle from a reference position at start and end points in the driving interval;

a vehicle weight calculator calculating an interval start point weight and an interval end point weight as a weight of the vehicle at the start and end points in the driving interval; and a potential energy change calculator calculating, as the driving environment variable, a potential energy change amount from the start point to the end point by using the interval start point altitude, the interval end point altitude, the interval start point weight, and the interval end point weight.

4. The driving evaluation apparatus according to claim 1, wherein the driving environment variable calculator includes an average vehicle distance calculator calculating, as the driving environment variable, an average of vehicle distance between the vehicle and a forward vehicle.

5. A driving evaluation apparatus for evaluating a result of driving a vehicle in a certain driving interval on the basis of driving data acquired at a time of driving in the driving interval, comprising:

an energy consumption efficiency calculator calculating an energy consumption efficiency in the driving interval, by using the driving data;

a driving environment variable calculator calculating a driving environment variable indicative of an environment factor which exerts an influence on energy consumption by driving in the driving interval, on the basis of the driving data;

a function storing unit storing a plurality of probability density functions or cumulative distribution functions having the energy consumption efficiency as a probability variable;

a function selector selecting a probability density function or a cumulative distribution function corresponding to the calculated driving environment variable; and an evaluation value calculator calculating an evaluation value for evaluating a result of driving in the driving interval by using the selected probability density function or the selected cumulative distribution function and the calculated energy consumption efficiency, wherein the energy consumption efficiency calculator calculates an energy consumption amount in the driving interval, a travel distance in the driving interval, and an idling energy consumption amount as an energy amount consumed by idling for a predetermined time or longer in the driving interval, and calculates, as the energy consumption efficiency, a no-idling energy consumption rate which is an expected energy consumption rate in the case where no idling is performed for the predetermined time or longer, on the basis of a no-idling energy consumption amount as a difference between the energy consumption amount and the idling energy consumption amount and the travel distance.

6. The driving evaluation apparatus according to claim 5, wherein the evaluation value calculator calculates a reference energy consumption rate as an energy consumption rate corresponding to a reference probability indicative of a given target driving skill level, by using the probability density function or the cumulative distribution function selected by the function selector, calculates a reference energy consumption amount as an energy amount consumed in the case where driving is performed at the reference energy consumption rate, and calculates the evaluation value by adding the idling energy consumption amount to a difference between the no-idling energy consumption amount and the reference energy consumption amount.

7. The driving evaluation apparatus according to claim 5, the driving environment variable calculator comprising:

a vehicle altitude calculator calculating an interval start point altitude and an interval end point altitude as altitudes of the vehicle from a reference position at start and end points in the driving interval;

a vehicle weight calculator calculating an interval start point weight and an interval end point weight as a weight of the vehicle at the start and end points in the driving internal; and a potential energy change calculator calculating, as the driving environment variable, a potential energy change amount from the start point to the end point by using the interval start point altitude, the interval end point altitude, the interval start point weight, and the interval end point weight.

8. The driving evaluation apparatus according to claim 5, wherein the driving environment variable calculator includes an average vehicle distance calculator calculating, as the driving environment variable, an average of vehicle distance between the vehicle and a forward vehicle.

* * * * *